Figure 3:
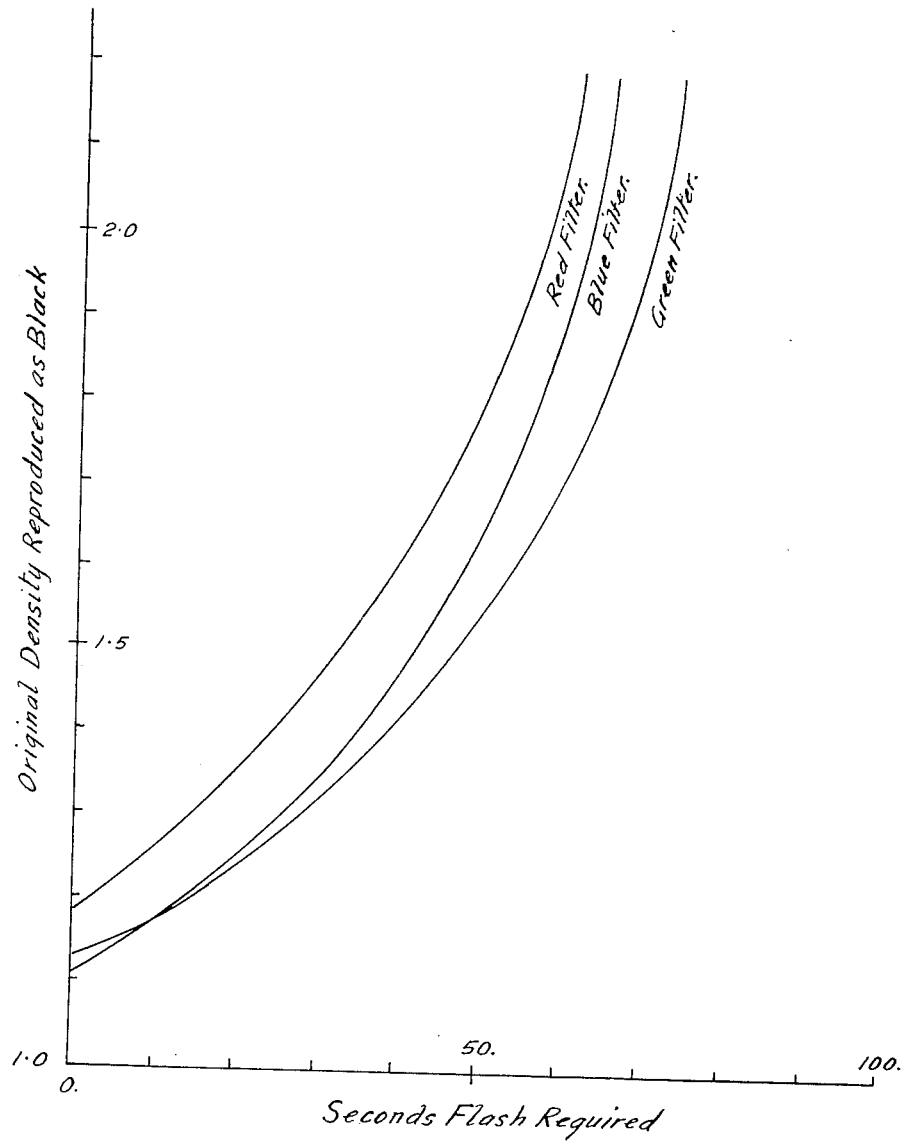

Oct. 18, 1955
D. C. GRESHAM
2,721,032
CALCULATING DEVICES FOR CALCULATING
PHOTOGRAPHIC EXPOSURE DATA
Filed Aug. 4, 1952
2 Sheets-Sheet 1
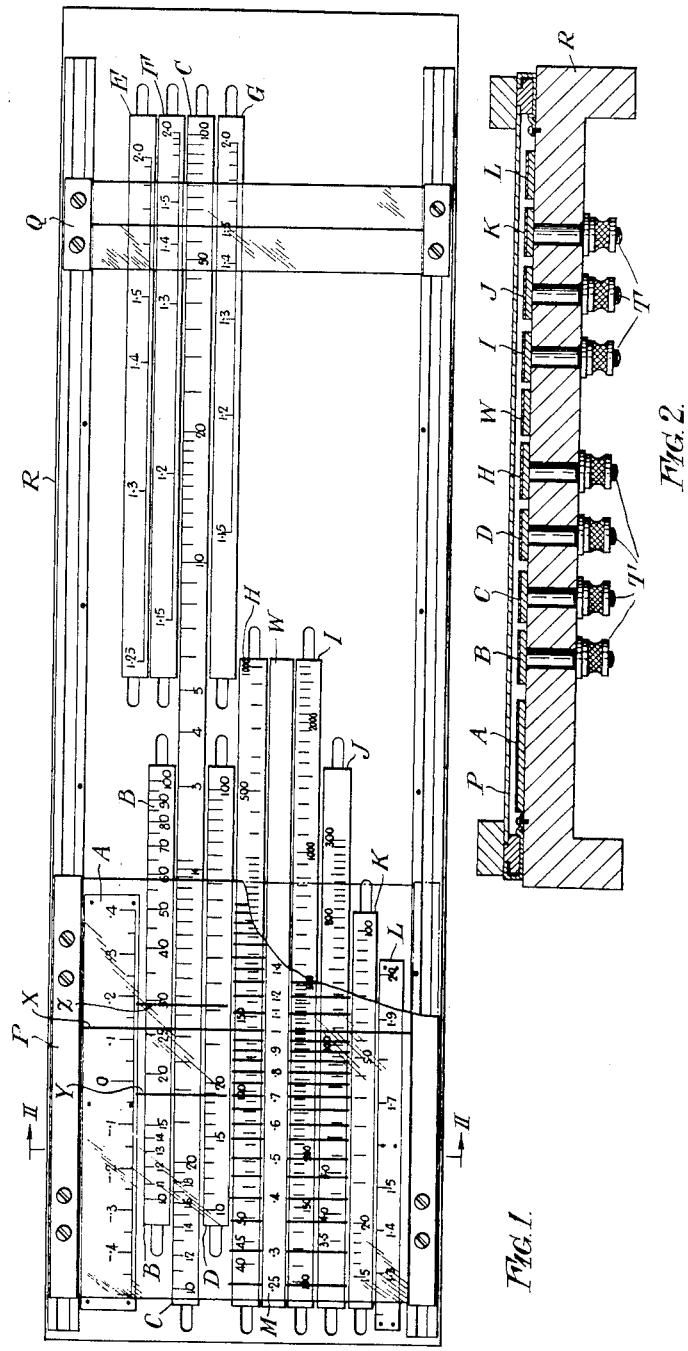

United States Patent Office 2,721,032
Patented Oct. 18, 1955

2,721,032
CALCULATING DEVICES FOR CALCULATING PHOTOGRAPHIC EXPOSURE DATA

Donald Charles Gresham, London, England, assignor to McCorquodale & Company Limited, London, England, a British company Application August 4, 1952, Serial No. 302,561
Claims priority, application Great Britain August 16, 1951

8 Claims. (Cl. 235—64.7)

This invention relates to a calculating device and particularly to a device of slide-rule or analogous construction of value in the calculation of exposure data in the production of colour separation records in photolithographic and photoengraving processes.

In our co-pending application Serial No. 206,120, now Patent No. 2,704,252, we have described, inter alia, a process for the production of a set of screen positive records recording different colour sensations of an original multicoloured subject, and suitable for the preparation of litho plates for reproduction of the original in different coloured inks at least one of which inks absorbs undesirably in a waveband which it should freely transmit, which comprises producing the separate screen positive records each by exposing a photographic plate or film behind a half-tone screen to light from the original subject, developing the latent image obtained, thereby producing a negative image in silver, producing a coloured image in situ therewith and bleaching the said silver image, reversal exposing the said photographic plate or film to light incident on the same side thereof as the original exposure, the said light being of a colour to which the photographic emulsion is sensitive but which is absorbed by the said coloured image, redeveloping the photographic plate or film, fixing the photographic plate or film to remove any residual silver halide and removing the coloured image, the said reversal exposure being effected in each case at least partially to light from the original subject and, in the case of the separation record which records the colour response of the original in the waveband which is undesirably absorbed by the printing ink to be used with a litho plate derived from one other of the separation records, varying the said reversal exposure over the area of the image in correspondence with variations in the colour response of the original in the waveband of which said other separation record records the response of the original.

In carrying out the foregoing process in practice as illustrated in Example 3 of Patent No. 2,704,252 the following exposure steps are necessary:
(a) Preparation of the highlight mask:
  1. Single exposure of a plate
(b) Preparation of the blue separation screen positive:
  1. Exposure to original subject
  2. Flash exposure
  3. Reversal-exposure to original subject
  4. Uniform reversal re-exposure
(c) Preparation of the green separation screen positive:
  1. Exposure to original subject
  2. Flash exposure
  3. Reversal-exposure to original subject
  4. Uniform reversal re-exposure
(d) Preparation of the red separation screen positive:
  1. Exposure to original subject
  2. Flash exposure
  3. Reversal-exposure to original subject
  4. Uniform reversal re-exposure
(e) Preparation of the black printer:
  1. Exposure to original subject
  2. Auxiliary non-screen exposure to original subject
  3. Flash exposure
  4. Uniform reversal re-exposure In carrying out the process it is convenient to arrange that all the flash exposures are to the same colour and at the same intensity and that all the uniform reversal re-exposures are at a uniform colour and intensity.

The colour of the flash exposure light is not important but in practice it is found to be convenient to employ the same colour at all stages and most convenient to effect the flash exposures through a green filter associated with a sufficient neutral density to make the exposures of convenient length.

Summarising the foregoing description and referring to Example 3 of Patent No. 2,704,252 it will be seen that in carrying out the process the following exposures are necessary:

(i) The red, green and blue filter first exposures. These depend on (a) the batch of plates (b) the highlight density of the original.

(ii) The flash exposures through the "flash green" filter for each of these three negatives. These depend on (a) the speed to green light of the batch of plates in use, (b) the difference between the highlight and shadow densities of the original.

(iii) The exposures for the black printer through two of the red, green and blue filters; one with the screen and one without. These depend on (a) the batch of plates and (b) the shadow density of the original.

(iv) The red and green filter second exposures. These depend on (a) camera extension and (b) highlight density of the original.

(v) The uniform reversal exposures made through the green filter. These depend on the camera extension.

(vi) The uniform second exposure for the black printer. This depends on the camera extension.

(vii) The exposure for the highlight mask. This depends on (a) the batch of plates and (b) the highlight density of the original.

All the foregoing exposures have to be calculated and they are basically determined by the speed and light-sensitivity of the batch of plates in use, the highlight and shadow densities of the original subject (and therefore the density range of the original subject), and of course on such extraneous factors as the degree of enlargement being effected (the camera extension).

It is necessary for the operator to determine the sensitivity of the batch of plates in use and the highlight and shadow densities of the original, or to have these values determined for him, before he can commence to calculate the exposures required at the different stages and even so a degree of mathematical skill is required which is not always possessed by operators who are otherwise quite capable of operating the process.

It is an object of the present invention to provide a calculating device which can be set to the sensitivity of the plates as determined by preliminary tests and which is provided with a scale of highlight and shadow densities so that the highlight and shadow densities of the original being previously determined, the device can then be employed to read off the required exposure times at all stages in the process, the said calculator being also of value in other processes of producing colour separation records.

The invention will be described with reference to a linear slide-rule construction but it will be appreciated that similar devices may be made on the principle of the well known logarithmic circular calculators.

According to the present invention a slide-rule calculating device comprises the following scales and cursors:

(a) A fixed linear scale of highlight densities
(b) A first adjustable logarithmic exposure scale juxtaposed to scale (a) and such that a distance of 0.3 on scale (*a*) is equal to a doubling of the exposure value on scale (*b*)

(*c*) A second adjustable logarithmic exposure scale similar to scale (*b*) and similarly located (*d*) A third adjustable logarithmic exposure scale similar to scale (*c*) and similarly located (*e*) A fourth adjustable logarithmic exposure scale connected to one of scales (*b*), (*c*) and (*d*) to move therewith e. g. constituting an extension of one of said scales (*f*) A first fixed density range scale juxtaposed to scale (*e*)

(*g*) A second fixed density range scale similar to (*f*) and juxtaposed to scale (*e*)

(*h*) A third fixed density range scale similar to (*f*) and juxtaposed to scale (*e*)

(*i*) A fourth adjustable logarithmic exposure scale covering longer periods of exposure than scales (*b*), (*c*) and (*d*) and juxtaposed thereto (*j*) A fifth adjustable logarithmic exposure scale covering longer periods of exposure than scales (*b*), (*c*) and (*d*) and juxtaposed thereto (*k*) A sixth adjustable logarithmic exposure scale similar to scales (*i*) and (*j*) and similarly located (*l*) A fixed linear scale of shadow densities (of the same pitch as scale (*a*)) juxtaposed thereto together with a cursor covering all of scales (*a*), (*b*), (*c*), (*d*), (*i*), (*j*), (*k*) and (*l*) and a cursor covering all of scales (*e*), (*f*), (*g*) and (*h*).

All the logarithmic scales referred to have the same modulus.

In a preferred form of the invention the cursor which covers scales (*a*), (*b*), (*c*), (*d*), (*i*), (*j*), (*k*), and (*l*) itself carries a scale (*m*) of multiplication factor dependent on the extension of the camera.

A particular form of device in the form of a slide rule is illustrated in Figures 1 and 2 of the accompanying drawings in which the body of the slide rule R carries scales as follows:

Scale A is a fixed scale of highlight densities. Scales B, C and D are respectively identified as the red, green and blue exposure scales, scale C (green) being extended to lower values than the others, scales E, F and G are respectively identified as the red, green and blue density range scales, scale H is identified as the red second exposure scale, scale I is identified as the green second exposure scale, scale J is identified as the black printer exposure scale, scale K is identified as the highlight mask exposure scale and scale L is a fixed scale of shadow densities disposed in relation to scale A so that the value 1.75 on scale L lies opposite to the value 0 on scale A. Cursor P carries, as shown, a scale of extension factors M with guiding lines, and a second cursor Q is provided over scales E, F, G and the extension of scale C.

In setting up the foregoing slide-rule device a number of factors must be determined and the scales set in position. For each batch of plates certain preliminary tests must be carried out to determine the optimum exposures necessary to give the required results on such plates. The scales B, C and D are then set with the exposure times thus determined in line with the highlight density value on scale A of the original employed for the tests and scales B, C and D are then fixed in these positions. They do not need to be moved again unless and until a batch of plates of different sensitivity is brought into use.

To graduate scales E, F, and G and fix them in position, tests are carried out to ascertain what density on the original will be reproduced correctly as black with various flash exposures on the apparatus in use and a graph is drawn (in respect of each of the red, green and blue first exposures) linking original densities to flash exposure times. The said graph is shown in Figure 3 of the accompanying drawings. The density range scales E, F and G are drawn directly from these graphs and do not need to be altered in position unless a change is made in the standard of the screen positive required or in the camera apparatus employed. These scales are accordingly fixed in position in relation to the right hand end of scale C which is a logarithmic scale of green flash exposures in seconds. Scales E, F and G are calibrated by use of the graph shown in Fig. 3. The ordinates of the three curves (density) are determined for particular values of exposure times (seconds flash required). The ordinate values are then marked on scales E, F and G, corresponding to curves designated Red, Green and Blue, each value of density corresponding to an exposure time on scale C.

Scales H, I, J and K are positioned by means of preliminary test exposures and do not need to be altered unless the process is changed.

Cursor P is provided with a main hair-line X and subsidiary hair-lines Y and Z located 0.15 density units to the left and 0.05 density units to the right respectively (measured on scale A) these values being determined by preliminary experiment.

Whenever a fresh batch of plates is brought into use scales B, C, D and K must be re-adjusted to accommodate any variation in sensitivity but unless a batch of plates carrying a photographic emulsion of different character is brought into use the calculator remains set providing no change is made in the desired tonal requirements of the screen positives.

Figure 2 shows a part-sectional view of the slide-rule along the line II—II, showing the locking nuts T for slides B, C, D, H, I, J and K. Similar nuts are provided for locking scales E, F and G but are not shown. W is a fixed white reflecting strip making it possible to view the scale M on cursor P clearly.

The following is a description of the method of use of the calculator just described, showing the sequence of operations:

The line X on cursor P is set to the highlight density of the original on scale A and the three first exposure times through the red, green and blue filters are read off directly under the hair-line X on scales B, C and D respectively.

Cursor Q is set to the density range of the original on each of scales E, F and G in turn and the flash exposures appropriate to the red, green and blue filter negatives are read off directly on the extension of scale C. The scales are conveniently arranged so that these values are given in seconds.

This completes the exposures required for the three colour separation negatives.

The negative exposure for the black printer is made up of three parts. The hair-line X on cursor P is set to the shadow density of the original on scale L. Cursor line Z then indicates the correct exposure time on any of scales B, C and D according to the filter being used. Cursor line Y indicates the correct time for the auxiliary non-screen exposure of any of scales B, C and D according to the filter being used. The flash exposure for the black printer is determined by setting cursor Q to the density range of the original on one of scales E, F and G (according to the colour of the filter used for the negative exposure) to the original and read off on the extension of scale C. This completes the exposure of the black printer negative.

The reversal exposures of the separation negatives through the red and green filters are determined by setting the hair-line X on cursor P to the highlight density of the original on scale A and are read off on scales H and I, these scales being correctly positioned and fixed when the process is set up. If the extension factor is other than unity the values on scales H and I are read off against the appropriate factor on scale M.

The second flash exposures are conveniently arranged to be one 1/10 of the original green filter exposure to the original and are determined by setting line X on cursor P to the value 0 on scale A reading off the exposure value on scale I against the appropriate extension factor on scale M and dividing mentally by ten.

The correct second exposure for the black printer is indicated on scale J by setting the hair-line X on cursor P to the value 0 on scale A and reading off the value on scale J which is in line with the appropriate extension factor on scale M.

The highlight mask exposures are determined by setting the hair-line X to the value 0 on scale A and setting scale K by preliminary test into a position so that the correct exposure time is in line therewith. Thereafter the correct exposure time for highlight masks from originals of any highlight density are found by moving cursor line X to the appropriate reading on scale A and reading off the exposure on scale K.

It will be seen therefore that by deciding in advance what are the tonal requirements of the reproduction and by carrying out preliminary tests on the batch of plates to be used, the whole of the scales (other than M) may be pre-set in position and the exposures required for any original of which the highlight and shadow densities are known can be determined by simple operation of the cursors. It will be further appreciated that the order of the scales may be different from that shown in the accompanying drawing. In manufacturing the device scales A and L are immovably fixed in position and locking means T are provided in respect of each of scales B, C, D, E, F, G, H, I, J and K so that they may be firmly fixed in their pre-set positions.

When the circumstances of the process in use make it possible to make the second exposures at a fixed aperture/extension ratio, scale M will not be necessary and may be omitted. Similarly if the circumstances of the process make it possible to do without a highlight mask, e. g. by giving auxiliary "screen-forward" exposures to each of the negatives, scale K may also be omitted.

As indicated above, the calculator of this invention may be used for purposes other than in carrying out the process of Patent No. 2,704,252. Thus it may be used to calculate exposures for the process described in co-pending application No. 211,842, now abandoned. Scale B or C is set to indicate the screen exposure found to be correct for one original and thereafter the correct exposure for any original may be read off opposite the appropriate highlight density on scale A. Scales E or F have to be moved to indicate the correct flash exposure but can then remain set. In this process the second exposures are made at a fixed aperture/extension ratio so that scale M on cursor P need not be used. Scale H would be suitable for second exposures, using the hair-line X on cursor P.

Exposures for ordinary screen separation negatives can be determined from scales B, C and D. Flash exposure can be read off the extension of scale C but scales E, F and G have to be moved to appropriate positions.

In making line negatives it is not good practice to alter the lens aperture with the camera extension since there is an aperture which gives optimum definition and which should be used irrespective of the scale of reproduction. Scale J can therefore be set so that the known correct exposure for a particular extension is opposite the appropriate extension figure on scale M. The correct exposure for any other extension can then be read off against the appropriate figure on scale M.

I claim:

1. A slide-rule calculating device for calculating photographic exposure data comprising: a first stationary linear scale having indicia disposed thereon representing highlight values of an object to be photographed; a plurality of first settable stationary logarithmic scales, each designated by a color, mounted in parallel relationship with said first linear scale and having indicia disposed thereon representing exposure times when aligned with indicia on said first linear scale, said exposures for recording color values of said object on separate photographic emulsions; a second stationary linear scale mounted in parallel relationship to said first linear scale and having indicia disposed thereon representing density values of the shadows of the object to be photographed, said second linear scale indicating exposure times for recording black printer values when aligned with said plurality of first settable logarithmic scales; and a plurality of second settable stationary logarithmic scales, each designated by a color, mounted in parallel relationship with said first linear scale and having indicia disposed thereon representing exposure times necessary for causing an image reversal on a treated photographic emulsion when aligned with indicia on the first linear scale.

2. A slide rule calculating device in accordance with claim 1 wherein a plurality of third settable scales is positioned in parallel relationship with said first linear scale, said third settable scales having indicia disposed thereon which represent exposure times for overall light exposures made with a color filter identified with one of said first settable scales, an extension scale secured to said one of first settable scales and settable with it, and means for aligning indicia on the extension scale with indicia on any one of said third settable scales for determining said exposure times.

3. A slide rule calculating device in accordance with claim 2 wherein a first and second cursor are slidably engaged to move over a plurality of said scales, said engagement providing parallel movement of the cursors in relationship to said scales, and alignment means secured to a portion of each cursor.

4. A slide rule calculating device in accordance with claim 3 wherein said first cursor covers the first and second linear scales and the plurality of first and second settable scales, and said second cursor covers the plurality of third settable scales and the extension scale.

5. A slide rule calculating device in accordance with claim 4 wherein said first cursor includes a plurality of indicia disposed thereon and logarithmically spaced for providing multiplication factors used when the camera extension is varied.

6. A slide rule calculating device in accordance with claim 1 wherein the zero mark on the first stationary linear scale is aligned with the 1.75 mark on the second linear scale.

7. A slide rule calculating device in accordance with claim 4 wherein said first cursor includes a primary alignment means for the determination of exposure times for recording color values, a secondary alignment means for the determination of black printer screen exposure times, and a tertiary alignment means for the determination of black printer non-screen exposure times.

8. A slide rule calculating device in accordance with claim 4 wherein exposure times for a highlight mask are calculated by alignment with indicia on the first stationary linear scale and corresponding indicia on one of the second settable color logarithmic scales, determined by the color filter used.

References Cited in the file of this patent

UNITED STATES PATENTS

| | | |
|---|---|---|
| 753,840 | Barth et al. | Mar. 8, 1904 |
| 944,218 | Sommer | Dec. 21, 1909 |
| 1,426,825 | Dobson | Aug. 22, 1922 |
| 2,221,476 | Goodrich | Nov. 12, 1940 |

FOREIGN PATENTS

| | | |
|---|---|---|
| 109,107 | Great Britain | Sept. 6, 1917 |

OTHER REFERENCES

"Special Slide Rules," pages 19–31, by J. N. Arnold; published by Purdue University of Lafayette, Indiana, in September 1933.